Sept. 27, 1966  G. T. RALPHS  3,274,628
MANUFACTURE OF SHOE COMPONENTS
Filed May 31, 1962  5 Sheets-Sheet 1

Sept. 27, 1966 G. T. RALPHS 3,274,628
MANUFACTURE OF SHOE COMPONENTS
Filed May 31, 1962 5 Sheets-Sheet 2

United States Patent Office 3,274,628
Patented Sept. 27, 1966

3,274,628
MANUFACTURE OF SHOE COMPONENTS
George Trevor Ralphs, Oadby, England, assignor to The Ralphs Engineering Company Limited, Leicester, England
Filed May 31, 1962, Ser. No. 198,989
4 Claims. (Cl. 12—146)

This invention is for improvements in or relating to the manufacture of shoe components, the term "shoe" being used herein in a broad sense to include outer footwear generally wherever the context so permits. The invention is concerned with the manufacturing of pre-finished unattached outsoles and bottom units for shoes and has for an object to provide a procedure whereby such outsoles and bottom units can be produced economically with uniformly and accurately finished sole edges.

In accordance with the invention there is provided a method of producing pre-finished outsoles for shoes or shoe bottom units according to which a plurality of sole blanks are superposed one upon another and held together and whilst so held are together subjected to an edge trimming operation to produce the required edge contour on the blanks and afterwards to an inking operation to produce the required finished edge on the blanks. Preferably the sole blanks are also together subjected to an intervening operation of removing any loose particles from their edges before inking occurs. As compared with the previously practised procedure of trimming and inking unattached soles individually, a substantial economy is thus effected by enabling the pre-finished treatment to be carried out simultaneously on a plurality of soles in a shorter overall time period, thereby increasing the rate of production of the finished components with consequent economy in production costs.

In carrying out the invention it is convenient to perform the operations on a stack of soles consisting preferably of an even number thereof to provide a pair of pairs. Any convenient number of soles may be provided in the stack and for achieving a high rate of production it is desirable to form the stack as a reasonable number of pairs of soles, for example forming a stack up to about three inches deep. A convenient batch of soles for ladies shoes may consist of twelve pair lots of soles to match with the usual quantities or basic factors of quantities in which completed shoes of an individual size and style are normally produced. The soles may be arranged in a stack with rights and lefts opposite ways up, the whole stack being clamped between end plates when assembled together. The stack of sole blanks is then treated as a complete unit for the performance on all of the blanks simultaneously of the successive operations mentioned. Alternatively rights and lefts may be assembled wholly or mainly in different stacks.

The invention is conveniently practised in the production of pre-finished soles formed from synthetic soling materials but may also be carried out on soles formed of leather or leather substitutes. In each case the soles will normally have a finished face to be presented at the under face of the completed shoe and the soles will preferably be arranged in the stack so that those soles which are outermost in the stack have their finished faces directed inwardly of the stack. Thereby it can be ensured that when edge inking is performed the ink will not stray on to the finished faces of the soles since the stacking will prevent its ingress between soles in the stack.

The invention comprises a method of producing pre-finished sole members for shoes which comprises the successive steps of making an assembly or stack consisting of a plurality of shaped blanks disposed face to face with their shaped outer edges presented in registry at a peripheral surface of the assembly or stack, and, without disturbing that assembly, trimming said peripheral surface to the contour and dimensions required for the finished sole members and inking the trimmed peripheral surfaces.

The invention further includes a method of producing shoe bottom units comprising producing pre-finished outsoles in a manner as aforesaid and after subjecting such outsoles to any reducing treatment required, permanently attaching them to heels to form complete bottom units for subsequent attachment to the bottoms of shoes.

For practising the improved procedure aforementioned the invention further provides apparatus for use in compiling a plurality of identical sole blanks into a stack for performance on them of the said procedure, with the peripheral edges of the sole blanks in registry and presented at the periphery of the stack by refeence to a template having a peripheral shape corresponding to that of the sole blanks, which apparatus comprises a support, template locating means thereon for the detachable location of the template, a plurality of fences on the support for engaging a face of the sole blanks at peripherally spaced regions such that the blanks are located in the required register, and adjustable means for adjustably positioning the fences on the support by reference to the template. The apparatus may comprise a head opposite the support, the head and support being relatively movable to press the stack. There may also be provided means for the detachable location, without reference to the template, of clamping plates for engaging the endmost sole blanks of the stack.

A further provision of the invention is a method of producing pre-finished outsoles for shoes or shoe bottom units as above mentioned comprising the preliminary step of compiling a plurality of identical sole blanks into a stack, with the peripheral edges of the blank in registry and presented at the periphery of the stack, by setting in required relative positions a plurality of fences by means of a template having a peripheral shape corresponding to that of the blanks so that the fences are placed to engage the peripheries of the successive blanks stacked in edgewise engagement with them and thereby locate the blanks in the aforesaid registry, and stacking, or registering the stack of, the blanks against the fences.

The foregoing and other provisions of the invention will now be more particularly described with reference to the accompanying illustrative drawings in which FIGURE 1 is a perspective view showing diagrammatically the performance of a trimming operation;

FIGURES 1 to 4 of the drawings illustrate diagrammatically the principle edge treatment steps involved in the preferred procedure for producing pre-finished sole members for shoes or shoe bottom units. It will be seen that a stack of blanks in the form of shoe soles S, say a quantity of one or two dozen or more is compiled from precisely similar blanks of the required shape and of a size somewhat greater than the finished contour required to allow for trimming. The shaped blanks may be cut from a sheet or sheets of soling material in batches simultaneously, for example by direct cutting using a compound knife providing a suitable plurality of individual knives, each of the shape of the sole, assembled and mounted together in economic arrangement for stamping a corresponding plurality of sole shapes from the same sheet simultaneously. The blanks forming the soles are disposed face to face with their shaped outer edges presented in registry at a peripheral surface of the assembly or stack and positioned between clamping plates 10 and 11 of somewhat smaller size than the soles between which plates the soles are held for the performance of certain operations. The clamping plates 10 and 11 are formed with spaced apertures 12 by which they are located in correct relative positions whilst pressure is applied to them to clamp the soles between them during the performance of edge finishing operations on the soles. The stack of sole blanks is assembled in a manner as later described and the clamping of the soles between the plates 10 holds them sufficiently against relative displacement to enable the stack with its end clamping plates to be handled as a unit for transfer from one machine to another so that in each machine in which the soles are treated the stack of them can be held firmly between opposed clamping members engaging with the clamping plates 10. Subsequently the clamping members will be released to enable the stack to be transferred bodily from the machine.

Figure 1:
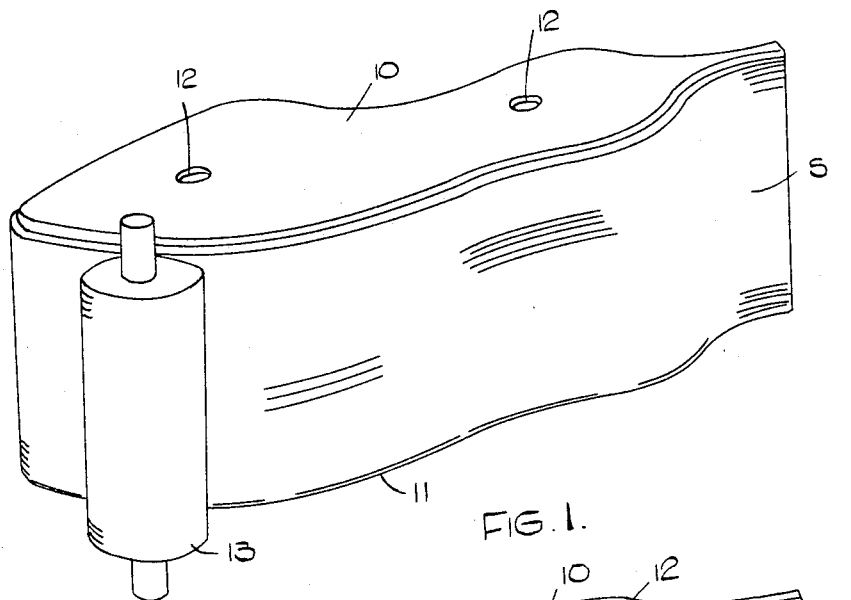
Figure 6:
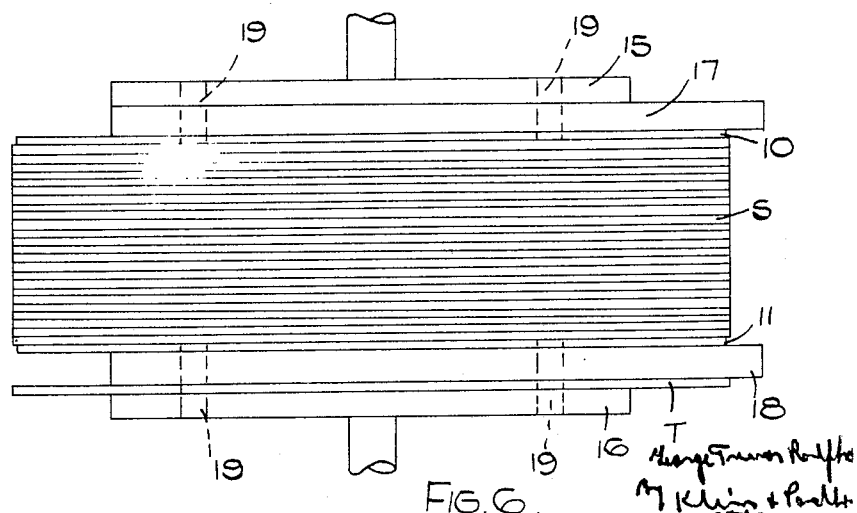
FIGURE 6 is a side elevation view of a stack of sole blanks as used in the procedure of FIGS. 1 to 4.

FIGURE 1 illustrates diagrammatically the performance of an edge trimming operation which is carried out simultaneously on all of the soles of a stack by means of a cutting or grinding tool 13 of a sufficient length to act on all of the soles S in the stack simultaneously. The edge trimming operation is performed by causing relative movement to occur around the contour of the soles S between the stack of soles and the tool 13 preferably in two strokes extending along the opposite sides of the sole members. The shape to which the soles are trimmed is governed by a template engaged by a follower on the spindle of the tool 13. This trimming operation can conveniently be performed by means of apparatus as described in co-pending U.S. application Serial No. 191,364, of G. T. Ralphs, filed April 30, 1962, now Patent No. 3,129,447. In such apparatus the soles S and clamping plates 10 and 11 are held between clamping members 15 and 16, FIG. 6, fitted with lining plates 17 passing through holes in the plates 17 and 18 and engaging in the apertures 12 in the clamping plates 10 and 11. The trimming template is indicated at T, being interposed between clamping plate 16 and the lining plate 18. As shown in detail in FIG. 2 the trimming tool 13 may be formed peripherally with a succession of circular ridges so as to trim the edges of the soles to a wavy form in cross-section, for ornamentation purposes.

Figure 3:
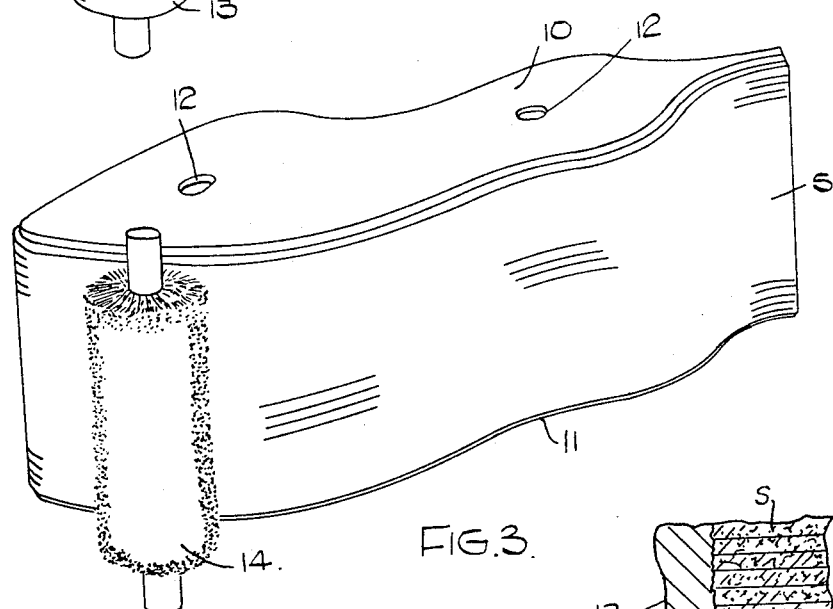
FIGURE 3 is a view similar to FIG. 1 but illustrating a further operation.
Figure 2:
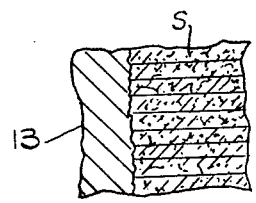
FIGURE 2 is an enlarged detail cross sectional view relating to FIGURE 1.

After the performance of the trimming operation, the soles S while still held together in the stack between the clamping plates 10 and 11 may be subjected to a brushing operation to remove loose particles from their edges by causing relative movement to occur between the stack and a brushing tool 14, as shown in FIG. 3, around the contour of the soles in the stack. The brushing operation may be performed in a separate machine similar in construction to the trimming machine but having a brush 14 substituted for the tool 13, or by any other convenient means.

Figure 4:
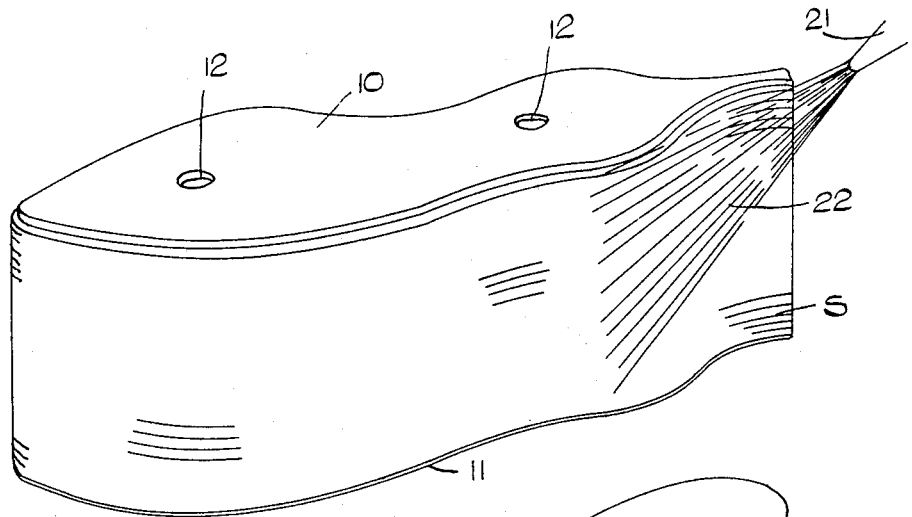
FIGURE 4 is a view similar to FIG. 1 but illustrating an edge finishing or inking procedure.

After the soles have been subjected to the brushing operation they are removed from the brushing apparatus complete with the clamping plates 10 and 11 still as a complete stack and transferred to a further machine in which ink is applied, preferably by spraying, to their exposed edges to produce the required edge finish. FIG. 4 illustrates diagrammatically the inking operation showing a spraying nozzle 21 used to direct a spray 22 of ink across the edges of the stack of soles. The spraying may be effected whilst relative movement is caused to occur automatically between the stack of soles S and the spraying nozzle 21 to traverse the spray 22 completely around the edges of the soles in the stack. To perform the spraying operation apparatus as described in U.S. patent application Serial No. 212,039, of G. T. Ralphs, filed July 24, 1962, may be employed.

It will be appreciated that considerable economy in the production of pre-finished soles results from the improved method in which a batch of sole blanks in a stack are subjected whilst in the stack to trimming and finishing operations simultaneously with the stack being treated as a single work unit. Any convenient numbers of soles S may be provided in the stack, and for achieving a high rate of production it is desirable to form the stack as a reasonable number of pairs of soles, for example forming a stack up to about three inches deep. Such a stack can conveniently be grasped between the fingers and thumb of one hand of the operator to hold the soles S and clamping plates 10 and 11 together in registry during transfer from one apparatus to another. A convenient batch of soles for ladies shoes may consist of twelve pair lots of soles to match with the usual quantities or basic factors of quantities in which completed shoes of an individual size and style are normally produced. The soles may be arranged in the stack with rights and lefts opposite ways up. Alternatively rights and lefts may be assembled wholly or mainly in different stacks.

The invention is conveniently practised in the production of pre-finished soles formed from synthetic soling materials, but may also be carried out on soles formed of leather or leather substitute. In each case the soles will normally have a finished face to be presented at the bottom face of the completed shoes and the soles will preferably be arranged so that those soles which are outermost in the stack have their finished faces directed inwardly of the stack. Thereby it can be ensured that when edge inking is performed the ink will not stay onto the finished faces of the soles since the stacking will prevent its ingress between soles in the stack.

Figure 5:
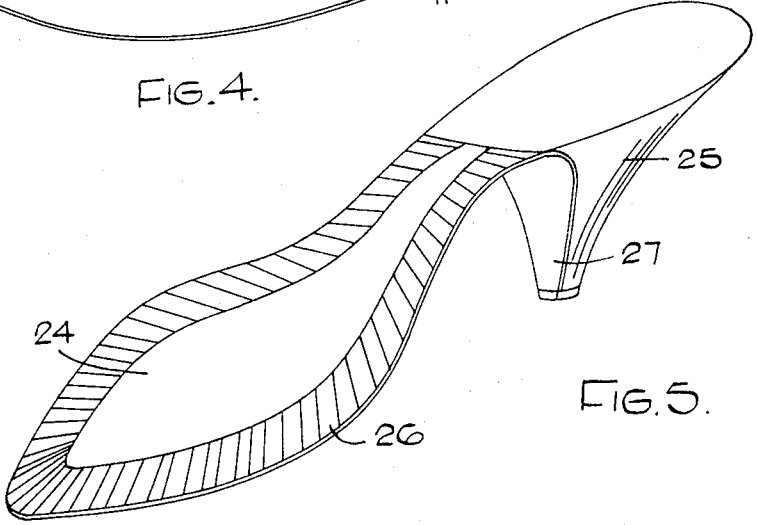
FIGURE 5 is a perspective view of a completed shoe bottom unit using a pre-finished sole prepared by the method illustrated in FIGS. 1 to 4.

The invention is conveniently practised in the production of bottom units for shoes consisting of combined soles and heels. An example of such a bottom unit for a ladies shoe is shown in FIG. 5 combining a sole 24 formed from one side of the sole blanks S with a heel 25. The procedure for producing bottom units as shown in FIG. 5 comprises firstly producing pre-finished outsoles in batches as above described by trimming and finishing them whilst stacked together, and subsequently subjecting the sole blanks S to any reducing treatment required, such as edge reduction as indicated at 26 in FIG. 5 and all over reduction of the substance of end portions 27 forming heel flaps. The sole blanks are then permanently attached to the heels 25 preferably being coated on their appropriate faces, i.e. the faces corresponding to that appearing uppermost in FIG. 5, with adhesive, the adhesive on the heel flaps 27 serving for attaching the soles to the breast faces of the heels 25. The pre-shaping and finishing of the soles causes the heel flaps 27 to be shaped accurately to coincide with the dimensions of the breast faces of the heels, so that when the soles are attached to the heels their forward portions will be correctly positioned as forward continuations from the heel seat, and accurately shaped to suit the contour of the shoe upper to which the bottom unit is to be attached. The adhesive on the forward portion of the soles 24 serves also for attachment of the soles to the shoe bottoms when the bottom units are applied to the lasted shoe uppers.

Obviously the shape of the ends of the sole blanks forming the heel flaps will be varied to suit different styles of shoes, those shown in FIGS. 1 to 4 being shaped to suit a slimmer heel than that shown in FIG. 5. Further, sole members corresponding to the members S but shaped differently may be adapted for attachment in accurate registry to heels by means of rearward sole portions which fit closely in suitably shaped recesses in the forward parts of the seat faces of the related heels.

Figure 7:
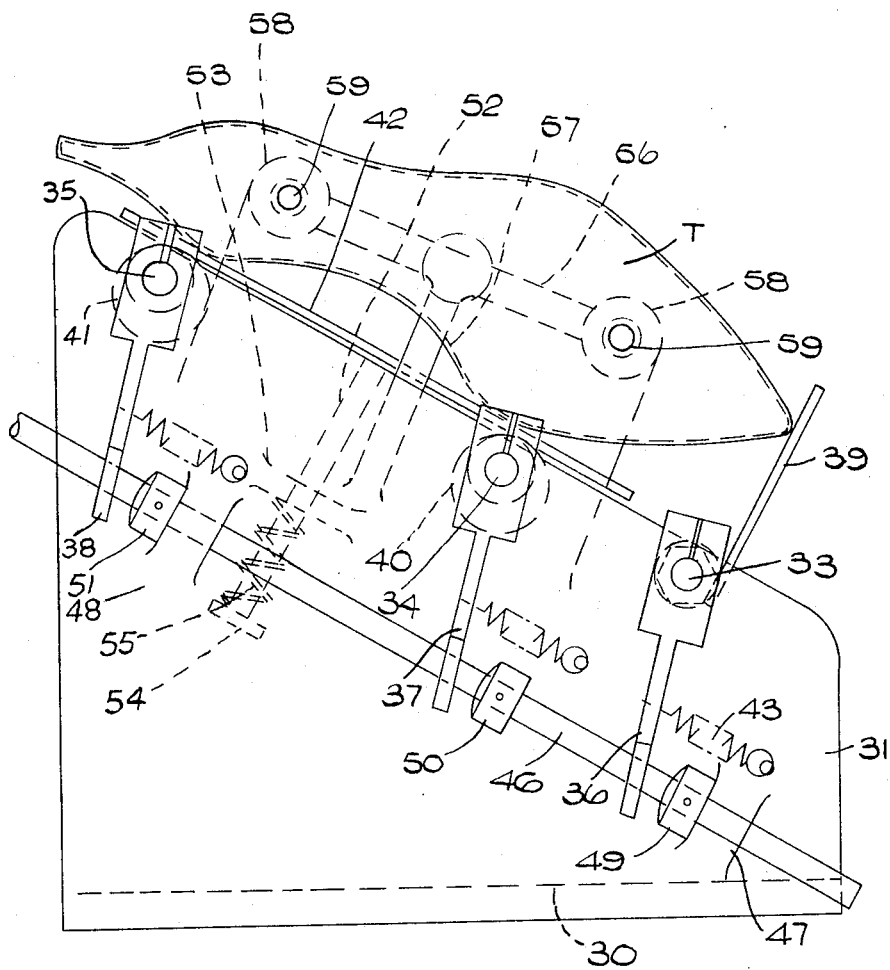
FIGURE 7 is a side elevation view of apparatus for compiling the sole blanks into a stack.
Figure 8:
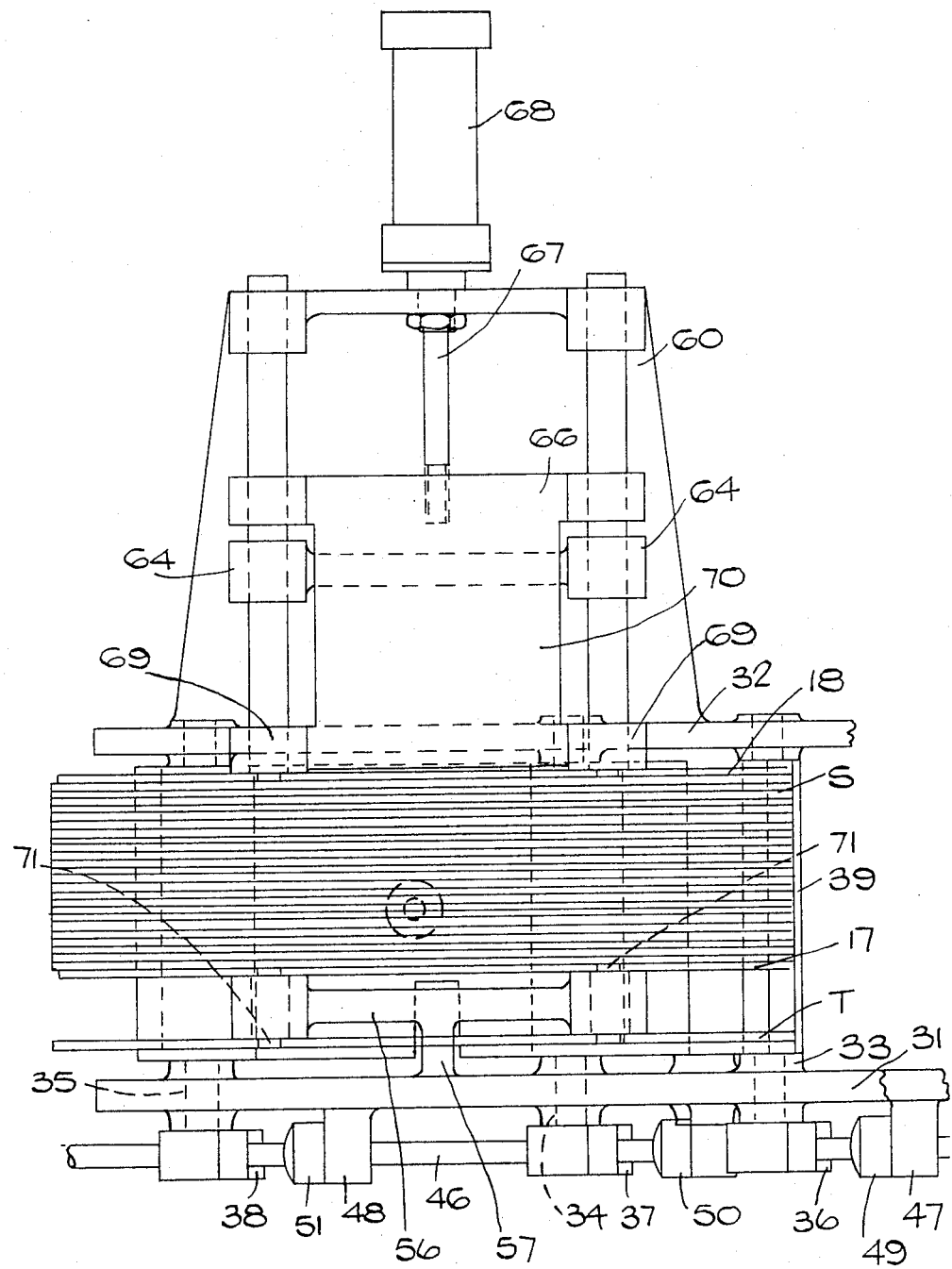
FIGURE 8 is a slant plan view of the apparatus of FIG. 7 as seen in the direction of the arrow A.
Figure 9:
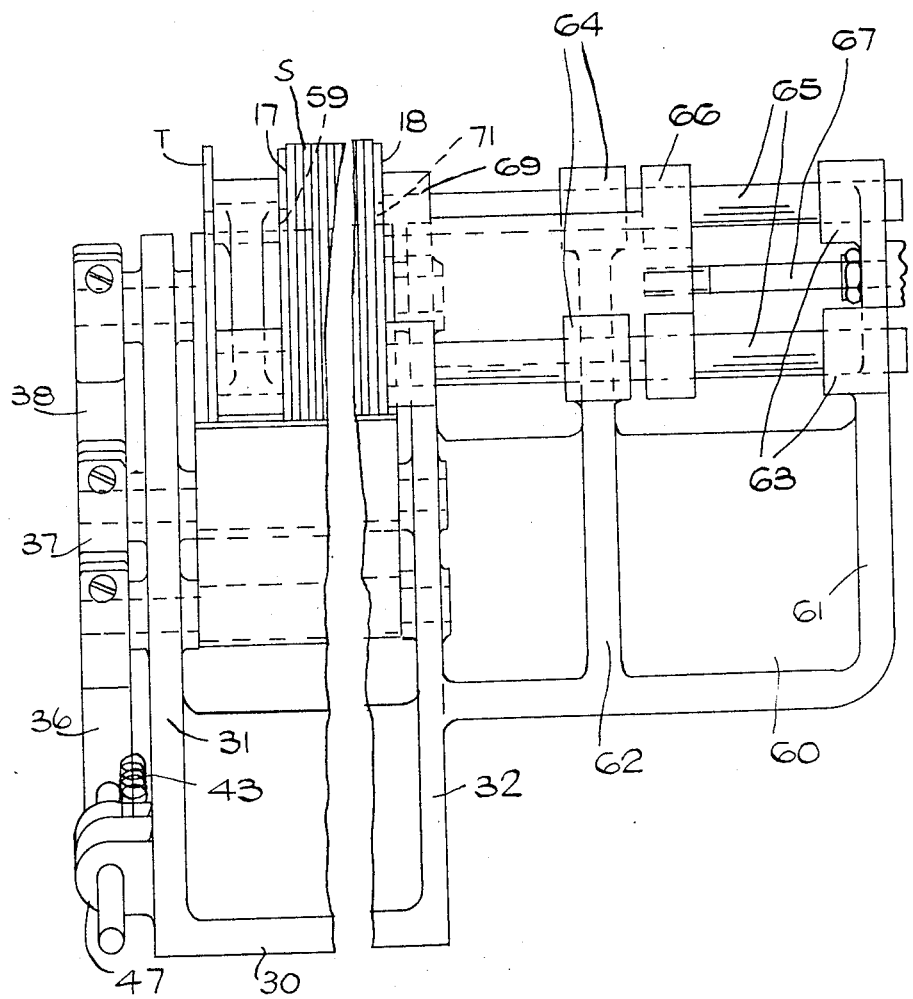
FIGURE 9 is an end elevation of the apparatus of FIG. 7 as seen in the direction of the arrow B.

A preferred manner of compiling a stack of soles S makes use of stacking apparatus as shown in FIGS. 7 to 9 of the drawings. Such apparatus comprises a base 30 having side walls 31 and 32 fixed thereto and supporting between them spindles 33, 34 and 35 having adjustably clamped to them operating arms 36, 37 and 38. Spindle 33 carries an upstanding plate 39 extending across the space between the walls 31 and 32 and fixed to the spindle 33 to turn with it. Spindles 34 and 35 have fixed to them respectively eccentrics 40 and 41 on which there rests a plate 42 extending across the space between the walls 31 and 32 and capable of up and down adjustment at each end by means of the eccentrics 40 and 41. The arms 36, 37 and 38 are acted on by springs 43, 44 and 45 respectively which tend to urge the arms and the spindles carrying them counter clockwise as viewed in FIG. 7 so as to tend to rock the plate 39 towards the left of the figure and to raise the plate 42 at both ends. The plates 39 and 42 are adapted to be adjusted to required positions against a template of the exact size and shape of the sole cut outs to be stacked, and to form abutment surfaces to engage the sole cut outs at three appropriate parts of their contour to enable a stack of sole cut outs to be compiled in correct registry with one another. Any convenient means may be employed for releasing the plates 39 and 42 by rocking the arms 36, 37 and 38 against the action of their springs for the purpose of enabling a template to be fitted to the apparatus. As shown the arms 36, 37 and 38 are fitted to ends of their spindles which project outwardly from the wall 31 and co-operate with a common operating rod 46 slidable in bearing lugs 47 and 48 provided on the wall 31. The rod 46 has adjustable collars 49, 50 and 51 secured to it for co-operation respectively with the arms 36, 37 and 38. A pneumatically operated cylinder or other operator actuated device is coupled to the rod 46 so that it can be caused to move upwardly to the left as seen in FIG. 7 and simultaneously turn the arms 36, 37 and 38 by means of the collars 49, 50 and 51 to release the plates 39 and 42. The plate 42 is conveniently mounted on a guide rod 52, FIG. 7, depending from it and slidable in an aperture in a web 53 fixed to the frame, and has a beaded lower end 54 acted on by a compression spring 55 to urge the plate 42 down against the eccentrics 40 and 41.

The mouting for a template T used for locating the plates 39 and 42 consists of an arm 56 forming part of a bracket having an upstanding portion 57 positioned centrally of the arm 56 and secured to the side wall 31 on the inside thereof. At the opposite ends of arm 56 there are bosses 58 in which are located short rods or pins having projections 59 which protrude somewhat on each side of each boss. The pins 59 engage in locating holes correspondingly positioned in the template T when the latter is fitted to the apparatus whilst the arms 36, 37 and 38 are swung to the left as seen in FIG 7 to release the plates 39 and 42. With the template in place the rod 46 is moved to the right so as to release the arms 36, 37 and 38, the springs of which then rock them to urge the plates 39 and 42 into engagement edgewise with the template T. It will be seen that the plate 39 bears against the toe-end of the template whilst the plate 42 bears against two places on one side of the template thus giving a three-point location for the sole cut outs.

As seen in FIGS. 8 and 9 the side wall 32 of the frame is provided with an outrigger frame 60 having an upstanding end wall 61 and an upstanding intermediate wall 62. The walls 61 and 62 carry at their upper ends spaced bosses 63 and 64 which are aligned with the bosses 58 of the template holder. In the bosses 63 and 64 there are slidably mounted rods 65 which are connected by a cross member 66 fitted with an operating rod 67 formed by a piston rod of a pneumatic cylinder 68. By operation of the piston in the cylinder 68 the cross member 66 and rods 65 can be moved endwise between the limits of engagement of bosses on the cross member 66 with the bosses 63 on the one end and the bosses 64 on the other end. The rods 55 are further braced at their left hand ends by a cross member 69 similar to member 66 and the members 66 and 69 are connected by a central web 70 movable between the bosses 64. The rods 65 have at their ends on the left of FIG. 9 short projections 71 which are aligned with the inner projections 59 on the pins in the bosses 58.

In the operation of the stacking apparatus a template T of the required shape to correspond to sole blanks to be stacked is placed on the outer projections 59 whilst the plates 39 and 42 are withdrawn by means of the rod 46. The latter is then released so that the plates 39 and 42 are moved by the action of the springs 43, 44 and 45 into abutting contact with the toe end and two places on one side of the template T. The plates 39 and 42 are thus set to form registering means for the soles of a stack. At this point the pneumatic cylinder 68 has its piston retracted so that the cross member 69 is withdrawn to the right of FIG. 9. Clamp plates 17 and 18 somewhat smaller in size than the coutour of the soles are fitted respectively to the inner projections 59 and the projections 71 on the rods 65. At this stage the clamp plates 17 and 18 are more widely separated than is necessary to accommodate the stack of soles and the soles S are placed on the plate 42 in corresponding arrangement to the template T and caused to rest at two places on the plate 42 and have their toe ends abutting against the plate 39. The pneumatic cylinder 68 is then operated to move the rods 65 to the left as viewed in FIG. 9 causing the soles S to be clamped in close arrangement between the plates 17 and 18 and in correct registry with one another. The operator then grasps the stack of soles between fingers and thumb of one hand together with the clamp plates 17 and 18, holding the assembly together at a central portion. Whilst holding the stack the pneumatic cylinder 68 is de-energised to withdraw the rods 65 whereupon the stack of soles with end plates can be removed by the operator and applied to the work clamping means of the sole rounding machine. The operations aforementioned are then performed in turn on the stack of soles which can similarly be held together in registry in one hand by the operator during transfer from one machine to another on which the successive operations are performed.

What we claim is:

1. A method of producing pre-finished outsoles for shoes or shoe bottom units, wherein a plurality of sole blanks are superposed one upon another and held together in a stack, and, all while held together in the stack, the blanks are subjected to an edge trimming operation to produce the required edge contour on the blanks, any loose particles are removed from the trimmed edges, and afterwards, while the blanks are still held together in the same stack, the blanks are subjected to an inking operation to produce the required finished edge on the blanks.

2. The method of claim 1, wherein the sole blanks are superposed in the stack with rights and lefts having opposite sides up.

3. The method of claim 1, wherein the pre-finished outsoles are coated on their appropriate faces with adhesive, after being subjected to any reduction treatment required, and the outsoles are then permanently attached to heels to forms complete bottom units for subsequent attachment to the bottoms of shoes, the adhesive serving for the attachment of the soles to the shoe bottoms as well as their prior attachment to the heels.

4. A method of producing pre-finished sole members for shoes which comprises the successive steps of making an assembly or stack consisting of a plurality of shaped blanks disposed face to face with their shaped outer edges presented in registry at a peripheral surface of the assembly or stack, gripping the assembly of blanks together at an assembly station, without disturbing that assembly, transferring the same to a trimming station, trimming said peripheral surface of the assembled soles to the contour and dimensions required for the finished sole members, transferring the assembly of trimmed blanks to an inking station, and inking the trimmed peripheral surface while maintaining the assembly of soles undisturbed.

References Cited by the Examiner

UNITED STATES PATENTS

| | | | |
|---|---|---|---|
| 502,421 | 8/1893 | Loewer | 12—86.7 |
| 516,676 | 3/1894 | Crane | 12—86.7 |
| 2,051,374 | 8/1936 | Frost | 12—142 |
| 2,359,395 | 10/1944 | Stacey | 12—86.7 |

JORDAN FRANKLIN, *Primary Examiner.*

EDWARD V. BENHAM, *Examiner.*